Aug. 15, 1933.　　　W. SCHAEFFER　　　1,922,458
PROCESS FOR FILLING AN AMPULE
Filed Oct. 20, 1930
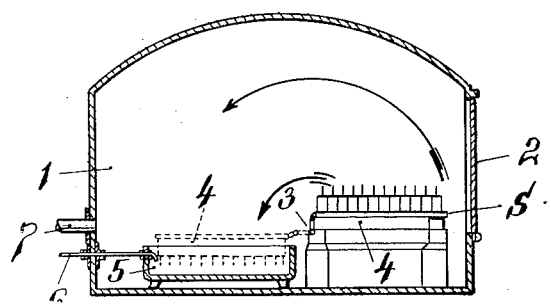

Patented Aug. 15, 1933

1,922,458

UNITED STATES PATENT OFFICE 1,922,458

PROCESS FOR FILLING AN AMPULE

Walter Schaeffer, Frankfort-on-the-Main, Germany

Application October 20, 1930, Serial No. 490,099, and in Germany October 25, 1929

3 Claims. (Cl. 226—68)

Hitherto various methods have been used for enclosing liquids which are susceptible to attack by gases. Such methods however are not as easily carried out as a simple filling of the liquid in question into a receptacle with corresponding precautions, because it has been found in the known ampules that even after filling, the detrimental gases have access through the capillary tube before or during sealing of the ampule by fusion and in this way affect the liquid.

The object of this invention relates to a process for filling ampules with liquids in which the liquids are kept at all times in contact with a surrounding gas which is not detrimental to the said liquids.

One method by which this process may be carried out is illustrated in the accompanying diagrammatic drawing, in which the reference character 1 designates a cylindrical gas-tight vessel having a gas-tight closure 2 through which a plurality of ampules to be filled may be inserted. These ampules may be inserted in a container 4 which is hinged at 3 to a fixed support S. A vessel for the filling liquid is provided at 5 and a conduit 6 is provided through the wall of the cylindrical vessel whereby filling liquid may be led from a storage reservoir (not shown) to the filling vessel 5. A conduit 7 is provided for exhausting the air from the vessel 1 and for forcing a non-detrimental or neutral gas to the vessel.

The new process proposes to fill ampules with liquids which are sensitive to gases under the protection of gases which are neutral with respect to the liquids. The liquids or solutions are manufactured in the presence of a neutral gas with the complete exclusion of any gas which would in any way react therewith. The liquid in question passes from a sealed vessel (not shown) in which it is prepared into a cylindrical chamber 1 in which are disposed the ampules. These ampules exhibit the novel feature of a long capillary tube, the consequence of which is, that the capillary action is very great. The ampules are disposed in the cylindrical chamber in such manner that they rest with their capillary tubes on the base of the cylindrical vessel. The cylindrical vessel together with the empty ampules is closed and by repeated evacuation and subsequent admission of a neutral gas by means of conduit 7, freed from any gas which would be detrimental to the liquid. The liquid or solution with which the ampules are to be filled is then admitted under seal through conduit 6 into the bottom of the cylindrical vessel which is then evacuated; subsequently neutral gas is admitted to set up a pressure equal to atmospheric gas and in this way the ampules are automatically filled. The remainder of the liquid in the cylindrical vessel is drawn back into the preparation vessel and the latter is cut off from the cylindrical vessel in a gas tight manner. The cylindrical vessel containing the ampules is then centrifuged in a suitable device with the capillary tubes directed towards the centre of rotation so that the liquid is thrown to the bottom of the ampules to displace the bubbles therein and the capillary tube is freed from liquid in its lower portion adjacent the body of the ampule whereas due to the capillary action, portions of the fluid are retained in its free end. Thus the drops of liquid remaining in the capillary tubes serve as seals forming a reliable and gas tight closure preventing access of the outside atmosphere. The sealing by fusion can be effected in the usual manner.

What I claim is:

1. In the process of filling ampules in the presence of neutral gases the steps which comprise enclosing ampules having long capillary tubes in a gas tight container, evacuating said container and filling it with a neutral gas, feeding filling liquid into the container, filling the ampules by exhausting and readmitting the neutral gas, forcing the liquid from the lower part of the capillary tube into the body of the ampules by displacing the gas bubbles enclosed in the ampule and sealing the ampules at the lower end of the capillary tubes.

2. In the process of filling ampules in the presence of neutral gases the steps which comprise enclosing ampules having long capillary tubes in a gas tight container, evacuating said container and filling it with a neutral gas, feeding filling liquid into the container, filling the ampules by exhausting and readmitting the neutral gas, forcing the liquid from the lower part of the capillary tube into the body of the ampules by centrifuging the container with the filled ampules with the capillary tubes directed towards the centre of rotation and sealing the ampules at the lower end of the capillary tubes.

3. In the process of filling ampules in the presence of neutral gases the steps which comprise enclosing ampules having long capillary tubes in a gas tight container, evacuating said container and filling it with a neutral gas, feeding filling liquid into the container from a reservoir out of contact with gases acting detrimentally on the filling liquid, filling the ampules by exhausting and readmitting the neutral gas, drawing back the excess of filling-liquid into the reservoir, forcing the liquid from the lower part of the capillary tubes into the body of the ampules by centrifuging the filled ampules with the capillary tubes directed towards the center of rotation, and sealing the ampules at the lower end of the capillary tubes.

WALTER SCHAEFFER.